(12) United States Patent
Yamada

(10) Patent No.: US 9,560,858 B2
(45) Date of Patent: Feb. 7, 2017

(54) CONTINUOUS FOOD FREEZING DEVICE AND CONTINUOUS FOOD FREEZING METHOD

(75) Inventor: Yoshio Yamada, Yokohama (JP)

(73) Assignee: Technican Co., Ltd., Yokohama-shi, Kanagawa (JP)

( * ) Notice: Subject to any disclaimer, the term of this patent is extended or adjusted under 35 U.S.C. 154(b) by 624 days.

(21) Appl. No.: 13/380,556

(22) PCT Filed: Jun. 17, 2010

(86) PCT No.: PCT/JP2010/004055
§ 371 (c)(1),
(2), (4) Date: Feb. 22, 2012

(87) PCT Pub. No.: WO2010/150497
PCT Pub. Date: Dec. 29, 2010

(65) Prior Publication Data
US 2012/0137709 A1    Jun. 7, 2012

(30) Foreign Application Priority Data

Jun. 26, 2009    (JP) ................................. 2009-004401
Jul. 6, 2009     (JP) ................................. 2009-004669

(51) Int. Cl.
F25D 13/06    (2006.01)
A23B 4/09     (2006.01)
(Continued)

(52) U.S. Cl.
CPC ................. *A23B 4/09* (2013.01); *A23B 4/062* (2013.01); *A23L 3/361* (2013.01); *A23L 3/375* (2013.01);
(Continued)

(58) Field of Classification Search
CPC .................................. F25D 3/11; F25D 25/04
(Continued)

(56) References Cited

U.S. PATENT DOCUMENTS 3,605,434 A * 9/1971 Boese ....................... F28C 3/16
                                                          62/374
3,708,995 A * 1/1973 Berg ........................ F25D 3/11
                                                          62/374
(Continued)

FOREIGN PATENT DOCUMENTS

CN          1089811 A        7/1994
CN          2607550          3/2004
(Continued)

OTHER PUBLICATIONS

Translation of FR 2708422 A1.*
(Continued)

*Primary Examiner* — Elizabeth Martin
(74) *Attorney, Agent, or Firm* — Winstead PC

(57) ABSTRACT

An apparatus and a method for freezing foods includes a first conveyor having one end thereof located on the feed portion and that conveys the articles to be frozen in a first direction and a second conveyor extending directly beneath the first conveyor along thereof and conveying foods fallen from the other end of the first conveyor in a second direction opposite to the first direction. The apparatus further includes a coolant tank disposed beneath the second conveyor and storing coolant that freezes foods fallen from the second conveyor, a third conveyor having at least one portion thereof submerged in the coolant in the coolant tank and conveying the foods fallen from the second conveyor while immersing them in the coolant, and a coolant spraying means disposed above the first conveyor and spraying coolant toward the first conveyor.

13 Claims, 2 Drawing Sheets

(51) Int. Cl.
*A23B 4/06* (2006.01)
*A23L 3/36* (2006.01)
*A23L 3/375* (2006.01)

(52) U.S. Cl.
CPC ......... *F25D 13/065* (2013.01); *F25D 2500/02* (2013.01)

(58) Field of Classification Search
USPC .................................... 62/63, 374, 378, 380
See application file for complete search history.

(56) References Cited

U.S. PATENT DOCUMENTS

| | | | | |
|---|---|---|---|---|
| 4,103,507 | A | * | 8/1978 | Benois ............................. 62/63 |
| 5,611,213 | A | * | 3/1997 | Rasovich ........................ 62/374 |
| 5,878,582 | A | | 3/1999 | Appolonia et al. |
| 6,009,719 | A | * | 1/2000 | Ochs .............................. 62/380 |

FOREIGN PATENT DOCUMENTS

| | | | | |
|---|---|---|---|---|
| CN | 2767927 | | 3/2006 | |
| FR | 2708422 A1 | * | 2/1995 | ............. A23L 3/375 |
| FR | 2708422 A1 | | 2/1995 | |
| JP | 443931 | | 2/1969 | |
| JP | 52004988 A | | 2/1977 | |
| JP | 8308482 A | | 11/1996 | |
| JP | 9068378 A | | 3/1997 | |
| JP | 2000-171144 A | | 6/2000 | |
| JP | 2987590 B1 | | 6/2000 | |
| JP | 2007267688 A | | 10/2007 | |
| JP | 3153553 B2 | | 9/2009 | |
| JP | 3153743 U | | 9/2009 | |

OTHER PUBLICATIONS

Dimoula, Kerasina, "Supplementary European Search Report" for European Application No. 10791820.3, dated Feb. 27, 2013, 4 pages.
Chinese Office Action dated Sep. 17, 2013 for Chinese Patent Application No. 201080036323.6, 13 pages.
Australian Patent Examination Report No. 1 for Patent Application No. 2010263911 as issued Sep. 10, 2013, 3 pages.
Japanese Patent Office, "International Search Report for PCT/JP2010/004055", as mailed Aug. 17, 2010, (2 pages).
Taiwanese Office Action dated Jan. 8, 2015 for Taiwanese Patent Application No. 099120608; 8 pages.
Canadian Office Action dated May 11, 2016 for Canadian Application No. 2,766,743; 3 pages.

* cited by examiner

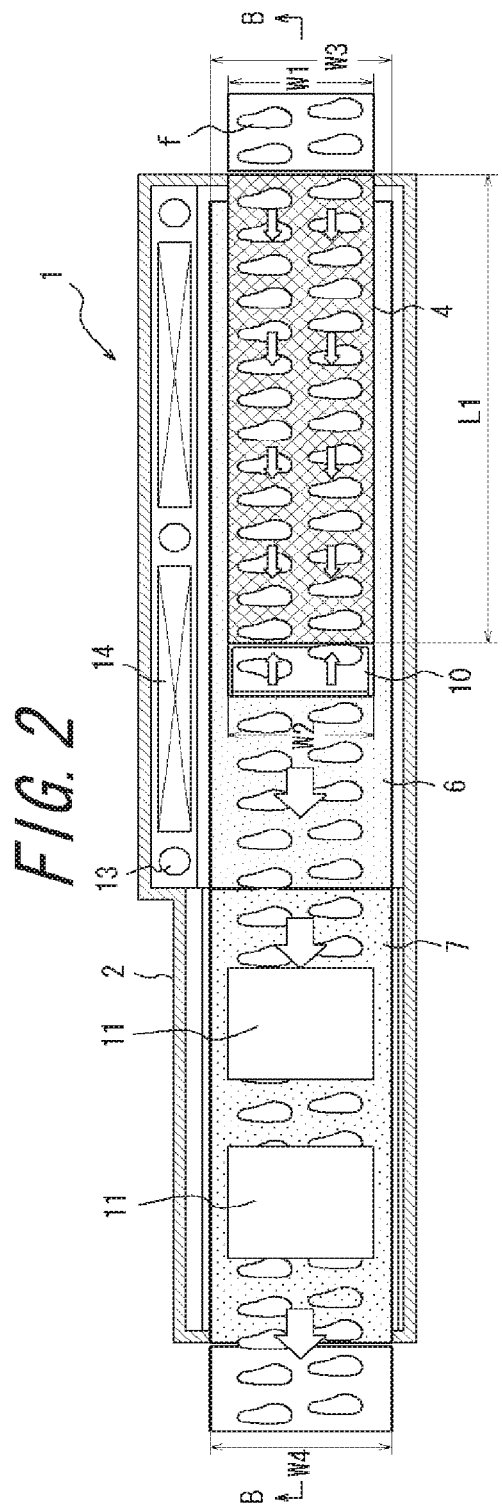

CONTINUOUS FOOD FREEZING DEVICE AND CONTINUOUS FOOD FREEZING METHOD

TECHNICAL FIELD

The present invention relates to a technique for freezing foods as articles to be frozen with liquid (brine freezing), and more particularly to apparatus and method by which foods can be frozen at a high quality.

BACKGROUND ART

Recently, as a freezing means of foods, liquid freezing with liquid (brine) as a freezing medium has increasingly been used, and with this liquid freezing, the temperature zone of maximum ice crystal formation (approx. 0 to −5° C.) in which ice crystals are formed can be passed through as fast as possible through immersion of foods in liquid (ethanol solution and the like) at temperatures from −20 to −35° C., for example, and thus foods can be frozen with little cellular destruction by ice crystals upon freezing.

As a freezing apparatus adopting such liquid freezing, for example, patent document 1 discloses a conveyor type freezing apparatus comprising a freezing tank filled with liquid at temperatures below 0° C., a conveyor for taking foods out to the atmosphere after the foods are immersed and frozen in the freezing tank and a blower disposed on the downstream of the conveyor and removing alcohol remaining in the foods having been immersed in alcohol in the freezing tank.

RELATED ART DOCUMENTS

Patent Documents

Patent document 1: JP2007267688 (A)

SUMMARY OF INVENTION

Technical Problem

However, with the above mentioned conventional conveyor type freezing apparatus, during conveyance by the conveyor, particularly when foods are fed into a freezing tank, the foods are overlapped or in contact with each other, thereby causing adhesive freezing, uneven freezing, increase in freezing time and the like. In light of this, it is possible to increase the spacing between foods on the conveyor to prevent them from being contact with each other during conveyance. However, in this case, decrease in food freezing throughput per unit time may cause a significant decrease in the freezing process efficiency.

It is therefore an object of the present invention to provide an apparatus and a method by which foods can be frozen at a high quality without decreasing the freezing process efficiency.

Solution to Problem

The present invention was made to solve the above mentioned problem. The continuous freezing apparatus for foods according to the present invention is characterized in that, in a continuous freezing apparatus for foods for freezing foods as articles to be frozen that are fed continuously from a feed portion while conveying them toward a discharge portion, including: a mesh-like first conveyor having one end thereof located on the feed portion and conveying the foods in a first direction from the one end to the other end; a second conveyor extending along the first conveyor directly beneath the first conveyor and conveying the foods fallen from the other end of the first conveyor in a second direction opposite to the first direction; a coolant tank disposed directly beneath the second conveyor and storing the coolant that freezes the foods fallen from the second conveyor; a third conveyor having at least one portion thereof submerged in the coolant in the coolant tank and conveying the foods fallen from the second conveyor while immersing them in the coolant in the coolant tank; and a coolant spraying means disposed directly above the first conveyor and spraying the coolant toward the first conveyor. It should be noted that the "mesh-like" means a shape having holes through which the coolant sprayed by the coolant spraying means passes downward, and is not limited to "net" itself. Further, "falling" means a falling due to gravity.

In a such continuous freezing apparatus for foods, the foods fed continuously from the feed portion are conveyed to the coolant tank through the first and the second conveyors. At this time, coolant released from the coolant spraying means disposed directly above the first conveyor is sprayed not only on the foods on the first conveyor but also on the foods on the second conveyor, and thus each surface of these foods are frozen earlier. Thereafter, the foods are fallen into the coolant tank from the second conveyor and are immersed directly in an alcohol solution in the coolant tank. The foods are then quickly cooled by the alcohol solution and frozen thoroughly while being conveyed by the third conveyor.

Therefore, according to the continuous freezing apparatus for foods of the present invention, each surface of foods can be frozen before they are fed into the coolant in the coolant tank. Thus, even if foods are overlapped with each other during conveyance, particularly when the foods are fed into the coolant tank, adhesive freezing of foods will not occur. Therefore change in the shape and uneven freezing due to overlapping may not occur. Further, a part of food can be frozen before it is frozen in the coolant tank, thereby achieving reduction in the size of coolant tank and the amount of alcohol solution to be used. Moreover, the first conveyor and the second conveyor are operated in opposite directions from each other, thereby achieving reduction in the total length of the apparatus. Furthermore, the present invention requires no downtime for defrosting, which has been needed by the conventional air blast freezing apparatus, and when compared with the air blast type freezing apparatus, the length of the freezer can be reduced by half.

In the continuous freezing apparatus for foods according to the present invention, it is preferable that the apparatus includes a reversing means disposed between the other end of the first conveyor and the second conveyor and leading the foods fallen from the first conveyor to the second conveyor by reversing them.

Further, in the continuous freezing apparatus for foods according to the present invention, it is preferable that the return portion of the second conveyor is located at the liquid level of the coolant in the coolant tank or below the liquid level.

Moreover, in the continuous freezing apparatus for foods according to the present invention, it is preferable that the apparatus includes a cold air blowing means disposed between the coolant tank and the discharge portion and blowing cold air onto the foods taken out from the coolant in the coolant tank.

Furthermore, in the continuous freezing apparatus for foods according to the present invention, it is preferable that the cold air blowing means is configured to allow for blowing of cold air at temperatures from −35 to −45° C.

Moreover, in the continuous freezing apparatus for foods according to the present invention, it is preferable that the coolant spraying means uses the coolant in the coolant tank as a supply source.

Further, in the continuous freezing apparatus for foods according to the present invention, it is preferable that at least one portion of the third conveyor is located directly beneath the second conveyor.

In order to solve the above mentioned problems, the continuous freezing method for foods according to the present invention is characterized in that, in the continuous freezing method for foods for freezing the foods continuously fed from the feed portion while conveying them toward the discharge portion, including the steps of: conveying the foods fed from the feed portion in a first direction by a mesh-like first conveyor; conveying foods fallen from the first conveyor in a second direction opposite to the first direction by a second conveyor extending along the first conveyor directly beneath the first conveyor; and conveying the foods fallen from the second conveyor by a third conveyor while immersing the foods in coolant in a coolant tank extending directly beneath the second conveyor, wherein during conveyance of the foods by the first and the second conveyors, the coolant is sprayed on the foods on the first and the second conveyors by a coolant spraying means disposed directly above these first and second conveyors.

In the continuous freezing method for foods according to the present invention, it is preferable that the foods fallen from the first conveyor are reversed before they are conveyed in the second direction by the second conveyor.

In the continuous freezing method for foods according to the present invention, it is preferable that, between the coolant tank and the discharge portion, cold air is sprayed on the foods taken out from the coolant in the coolant tank.

In the continuous freezing method for foods according to the present invention, it is preferable that, between the coolant tank and the discharge portion, cold air at temperatures from −35 to −45° C. is sprayed on the foods taken out from the coolant tank.

Advantageous Effect of Invention

According to the present invention, foods can be frozen at a high quality without decreasing the freezing process efficiency.

BRIEF DESCRIPTION OF DRAWINGS

FIG. 2 is an A-A cross sectional view in FIG. 1.

DESCRIPTION OF EMBODIMENTS

Figure 1:
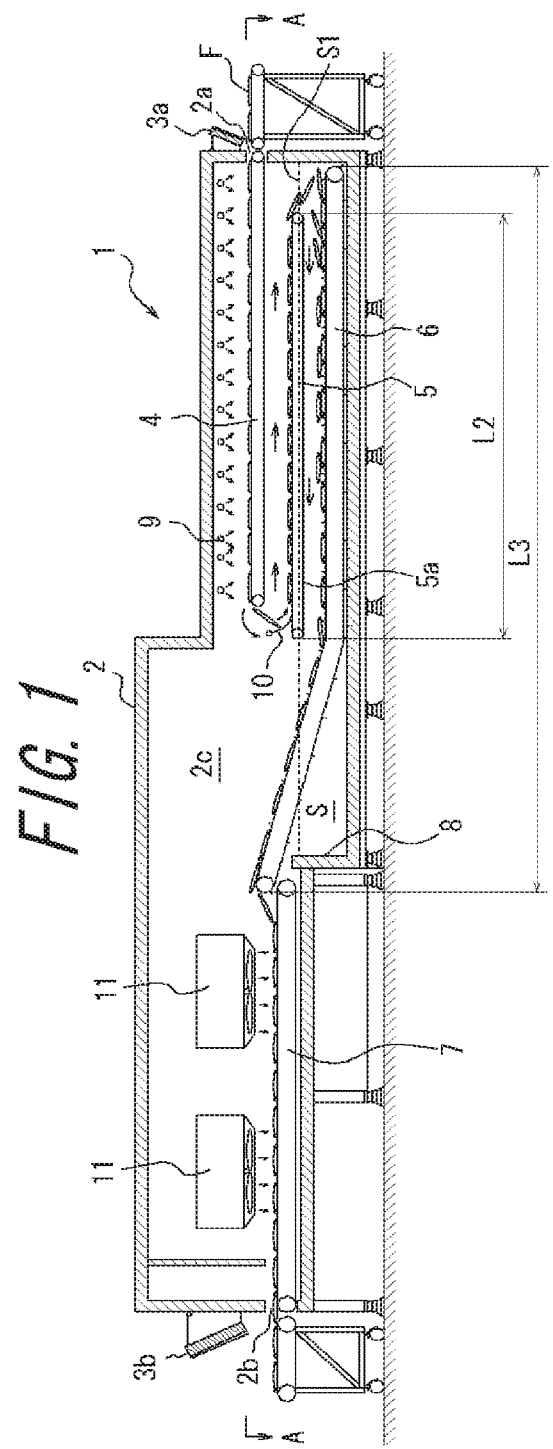
FIG. 1 is a B-B cross sectional view of a continuous freezing apparatus for foods of embodiment in accordance with the present invention in FIG. 2.

A detailed description of the present invention will be given below with reference to the embodiments shown in the drawings. It should be noted that the numerical reference 1 indicates a continuous freezing apparatus for foods in accordance with the present invention (hereinafter referred to as merely a "freezing apparatus").

As shown in FIG. 1, the freezing apparatus 1 opens a feed portion 2a on one end from which articles to be frozen, that is foods F such as meat and fish meat, are fed, and opens a discharge portion 2b on the other end from which the foods F are discharged. The apparatus includes a wall 2 therein for partitioning and forming a freezing chamber 2c, and inside the freezing chamber 2c is kept at below 0° C., here at −40° C. by a known temperature adjustment equipment (not shown). Further, the wall 2 is provided with cover bodies 3a and 3b for opening and closing the feed portion 2a and the discharge portion 2b respectively. When the apparatus 1 is not used, these cover bodies 3a and 3b are closed to seal the freezing chamber 2c.

Further, the freezing apparatus 1 includes first to forth conveyors 4 to 7 for conveying foods F fed continuously from the feed portion 2a toward the discharge portion 2b and a coolant tank 8 filled with, for example, alcohol (ethanol) solution S (here, at a temperature of approx. −30° C.) as coolant into which the foods F are immersed.

More specifically, the first conveyor 4 has one end (the end on the upstream side) located accessible from the feed portion 2a and conveys foods F in the first direction (from the right to the left in FIG. 1) from the one end to the other end (the end on the downstream side). The second conveyor 5, located directly beneath the first conveyor 4 and extending along the first conveyor, conveys the foods F fallen from the other end of the first conveyor 4 in the second direction (from the left to the right in FIG. 1) opposite to the first direction. The first conveyor 4 and the second conveyor 5 are belt conveyors having a belt made of metal or resin produced in a mesh manner, as shown in FIG. 2. Here, the return portion 5a of the second conveyor 5 is located at the liquid level S1 of the alcohol solution S in the coolant tank 8 or below (in the liquid) thereof (see FIG. 1).

For the third conveyor 6, one portion thereof is located directly beneath the second conveyor 5 and submerges under the alcohol solution S in the coolant tank 8, and the other portion (the end on the downstream side) bends upward in the middle in the forward direction so as to emerge from the alcohol solution S in the coolant tank 8. The conveying direction of the third conveyor 6 is the same as that of the first conveyor 4 (the first direction). The conveying speed and the conveying distance of the third conveyor may be adjusted such that the foods F are completely frozen in the coolant tank 8 or only surface layer of each food F is frozen.

For the fourth conveyor 7, it has one end thereof (the end on the upstream side) located on the point where the foods F are fallen from the third conveyor 6 and the other end thereof (the end on the downstream side) located on the discharge portion 2b, and conveys the foods from the falling point to the discharge portion 2b. It should be noted that the third conveyor 6 and fourth conveyor 7 can be a belt conveyor having a belt made of metal or resin produced in a mesh manner as in the case of the first conveyor 4 and the second conveyor 5, whereby removal and collection of alcohol solution S from the foods after being taken out from the coolant tank 8 can be facilitated.

The freezing apparatus 1 is disposed directly above the first conveyor 4 and further includes a plurality of showers 9 as a coolant spraying means for spraying alcohol solution S toward the first conveyor 4. Here, the shower 9 uses the alcohol solution S (approx. −30° C.) in the coolant tank 8 as a supply source and is configured to suck up the alcohol solution S and spray it toward the first conveyor 4. However, a supply source of alcohol solution sprayed from the shower 9 may be provided separately from the coolant tank 8.

The freezing apparatus 1 further includes, between the other end of the first conveyor 4 and the second conveyor 5, an arc-like reversing plate 10 as a reversing means for reversing, in other words, turning over, the foods F fallen from the first conveyor 4 and leading them to the second conveyor 5.

The freezing apparatus 1 further includes, between the coolant tank 8 and the discharge portion 2b, two cooler units 11 as a cold air blowing means by which cold air below 0° C., preferably from −35 to −45° C., here −45° C. (dry air) is blowable onto the foods F taken out from the alcohol solution S in the coolant tank 8.

It should be noted that the numerical reference 13 in FIG. 2 indicates an agitator for agitating the coolant, and the numerical reference 14 indicates a coil for cooling the coolant. Both of them are well known and thus their details are not described.

Next the procedures for operating the freezing apparatus 1 for freezing the foods F are described.

First, the foods F as articles to be frozen are continuously fed from the feed portion 2a and are fed on a mesh-like first conveyor 4, whereby the foods F are conveyed in the above mentioned first direction by the first conveyor 4. At this time, alcohol solution S at a temperature of approx. −30° C. is sprayed from a plurality of showers 9 disposed directly above the first conveyor 4, thus each upper side (the face facing upward) of the foods F on the first conveyor 4 are cooled and frozen. Next the foods F are fallen from the end portion on the downstream side of the first conveyor 4, then reversed by the reversing plate 10 and thereafter are lead to the second conveyor 5. For the foods F on the second conveyor 5, each face on the back side (the face facing upward) thereof is cooled by the alcohol solution S passing through and falling from the mesh-like conveyor 4 and frozen. Thereafter, the foods F are fall from the second conveyor 5 into the coolant tank 8 and are immersed directly in the alcohol solution S in the coolant tank 8. The foods F are cooled quickly by the alcohol solution S while being conveyed by the third conveyor 6 and are frozen completely.

Next, the foods F are taken out from the alcohol solution S by the third conveyor 6. The foods F fallen from the end portion on the downstream side of the third conveyor 6 are conveyed to the discharge portion 2b. At that time the alcohol solution S remaining in the foods F is removed when dry air at a temperature of −45° C., for example, is blown onto them by a unit cooler 11, and a further cooling effect is brought about by vaporization of the components of the residual liquid.

According to the freezing apparatus 1 including the above mentioned configuration, each surface of foods F can be frozen before they are fed into the alcohol solution S in the coolant tank 8. Thus, during conveyance, particularly when the foods F are fed into the coolant tank 8, even if the foods F are overlapped with each other, they may neither be frozen stuck together nor frozen unevenly. Further, the surface layer of each food F can be frozen before they are frozen in the coolant tank 8, thereby reducing the cooling load in the coolant tank 8 and achieving downsizing in the coolant tank 8 and saving of the amount of alcohol solution to be used. Moreover, the first conveyor 4 and the second conveyor 5 are operated in the opposite direction from each other, thereby reducing the total length of the apparatus 1 and allowing for spray of alcohol solution S on the foods F on the second conveyor 5 as well by the shower 9 disposed directly above the first conveyor 4. Furthermore, downtime for defrosting, which has been needed by the conventional air blast type freezing apparatus, is not needed, and compared with the air blast type freezing apparatus, the length of the freezer can be reduced by half.

Moreover, according to the freezing apparatus 1, the reversing plate 10 for reversing the foods F fallen from the first conveyor 4 and leading them to the second conveyor 5 is provided between the other end of the first conveyor 4 and the second conveyor 5. Thus it is ensured that both the upper side face and the bottom side face of the food F are frozen with a simple configuration.

Further, according to the freezing apparatus 1, the return portion 5a of the second conveyor 5 is located at the liquid level S1 of the alcohol solution S in the coolant tank 8 or below thereof, thus the foods F floating inside the coolant tank 8 can be held by the return portion 5a, and an even freezing of the foods F can be achieved.

Furthermore, according to the freezing apparatus 1, a unit cooler 11 for blowing cold air onto the foods F taken out from the coolant tank 8 is provided between the coolant tank 8 and the discharge portion 2b, thus the alcohol solution S remaining in the foods F can be removed and the foods F can be frozen additionally, which allows for reduction of cooling load in the coolant tank 8, and thus the coolant tank 8 can be downsized and the amount of alcohol solution S to be used can be reduced.

Moreover, according to the freezing apparatus 1, it is configured to suck up the alcohol solution S in the coolant tank 8 and to spray it toward the first conveyor 4 by the shower 9. Thus the alcohol solution S can be shared and downsizing in the whole apparatus and energy saving can be realized.

Furthermore, according to the freezing apparatus 1, the third conveyor 6 is disposed below the first conveyor 4 and the second conveyor 5. Thus the total length of the apparatus 1 can be reduced further and the alcohol solution S sprayed from the shower 9 can be reliably returned to the coolant tank 8.

It should be noted that, when the foods are frozen using the freezing apparatus 1, the conveying speed and the conveying distance of the first conveyor 4 and the second conveyor 5 and the spraying amount of alcohol solution S may be adjusted such that approx. 30% part of the food below the surface thereof is frozen by the shower 9 and the non-frozen portion around the center of the food F is frozen in the coolant tank 8. Thus the time required for freezing the food F can be reduced and downsizing in the coolant tank 8 can be achieved as well. More specifically, the cooling time in the coolant tank 8 can be reduced to approx. 50% and the coolant tank 8 can be downsized to approx. 30%.

Alternatively adjustment may be made such that the food F may be frozen down to the depth of approx. 80% below the surface thereof by the shower 9 and in the tank 8, and the food F taken out from the coolant tank 8 may be blown with cold air (dry air) at temperature of −45° C., for example, by a unit cooler 11 to freeze the non-frozen portion around the center of the food F. Thus freezing of the food F and removal of the alcohol solution S remaining in the food F can be achieved at the same time by blowing cold air, and thus the time required for freezing of the food F can be reduced and downsizing in the coolant tank 8 can be achieved. More specifically, cooling time in the coolant tank 8 can be reduced to approx. 75% and the coolant tank 8 can be downsized to about 50% as well.

In the above, descriptions were made based on the examples shown in the drawings. However, the present invention is not limited to the above mentioned examples, and may arbitrarily be changed within the description of the scope of claims. For example, the fourth conveyor and the cooler unit may be omitted and the end portion on the downstream side of the third conveyor may be located at the discharge portion. Further, according to the description above, the food as an article to be frozen is brought into contact directly with the coolant. However, the food may be treated with wrapping, packing, etc. before it is immersed in the coolant.

EXAMPLES

Next, an explanation of various evaluations using a various kinds of freezing apparatus to confirm the effect of the present invention is given below. Both the freezing apparatus of Example 1 and each freezing apparatus of Comparative Examples 1 to 3 are liquid freezing type that uses alcohol solution at a temperature of −30° C., whereas the freezing apparatus of Conventional Example 1 is air-blast freezing type (tunnel freezer). It should be noted that, in the present test, the amount of food to be frozen by each freezing apparatus was the same (approx. 60 kg).

Here, the freezing apparatus of Example 1 has the configuration shown in FIGS. 1 and 2, in which the first conveyor is 1200 mm wide (W1) and 6000 mm long (L1), the second conveyor is 1200 mm wide (W2) and 6000 mm long (L2), and the third conveyor is 1500 mm wide (W3) and 10000 mm long (L3).

The freezing apparatus of Comparative Example 1 includes a freezing tank filled with alcohol solution, a conveyor for taking food out to the atmosphere after the food is immersed in the freezing tank and two cooler units disposed on the downstream side of the conveyor. The apparatus differs from the freezing apparatus of Example 1 in not including a first conveyor, a second conveyor, a reversing plate and a shower.

The freezing apparatus of Comparative Example 2 differs from that of Comparative Example 1 in use of a gondola instead of a conveyor for conveying foods. The freezing apparatus of Comparative Example 3 is a batch type apparatus.

The evaluations were made at three levels such as good, acceptable and poor. In Table 1, good is represented by "A", acceptable is represented by "B" and poor is represented by "C". Further, for the evaluation of the shape of food after being frozen, when the ratio of damaged/deformed (including adhesive freezing) foods to the total number of frozen foods is less than 1%, it is evaluated as good, when it is 1 to 10%, it is evaluated as acceptable, and when it is more than 10%, it is evaluated as poor. For uneven freezing, when the ratio of uneven freezing to the total number of frozen foods is less than 1%, it is evaluated as good, when it is 1 to 5%, it is evaluated as acceptable, and when it is more than 5%, it is evaluated as poor. For extraction and change in concentration of alcohol solution, when the rate of change of volume and concentration before and after the use of apparatus is less than 1%, it is evaluated as good, when it is 1 to 5%, it is evaluated as acceptable, and when it is more than 5%, it is evaluated as poor. Moreover, in Table 1, the installation space refers to the installation space for the whole apparatus. The smaller the installation space becomes, the smaller the size of apparatus required for freezing the same amount of article to be frozen becomes.

TABLE 1

|  | Example 1 | Comparative Example 1 | Comparative Example 2 | Comparative Example 3 | Conventional Example 1 |
| --- | --- | --- | --- | --- | --- |
| Continuous operability | A | B | B | B | C |
| Freezing time | A | B | A | A | C |
| Drip, change in color | A | A | A | A | C |
| Shape of food after being frozen (including adhesive freezing) | A | B | B | B | A |
| Uneven freezing | A | A | B | B | B |
| Installation space | A | B | B | A | C |
| Extraction/change in concentration of alcohol solution | A | B | B | B | — |

As is obvious from the results shown in Table 1, by applying the present invention, foods can be frozen at a high quality without causing adhesive freezing (change in the shape of food) and uneven freezing. Further, for the continuous operability, the conventional apparatus can operate only for about 8 hours per day, whereas the apparatus of the present invention can operate for 24 hours. Further, for the freezing time, the apparatus according to the present invention can freeze 20 times faster than the conventional apparatus.

INDUSTRIAL APPLICABILITY

Thus, according to the present invention, an apparatus and a method for freezing foods at a high quality without decreasing the freezing process efficiency can be provided.

DESCRIPTION OF THE NUMERALS

1 Continuous freezing apparatus for food
2. Wall
2a Feed portion
2b Discharge portion
2c Freezing chamber
3a, 3b Cover body
4 First conveyor
5 Second conveyor
6 Third conveyor
7 Fourth conveyor
8 Coolant tank
9 Shower
10 Reversing plate
11 Cooler unit
13 Agitator
14 Coil for cooling

The invention claimed is:
1. A continuous freezing apparatus for freezing foods as articles to be frozen that are fed continuously from a feed portion while conveying them toward a discharge portion, comprising:

a first conveyor having a mesh belt with holes having one end thereof located on the feed portion and conveying the foods in a first direction from the one end to another end;

a second conveyor extending directly beneath the first conveyor along the first conveyor and conveying the foods fallen from the other end of the first conveyor in a second direction opposite to the first direction;

an arc-like reversing plate disposed between the other end of the first conveyor and the second conveyor and positioned to cause the foods to turn over between the first and second conveyors as the foods fall from the first conveyor to the second conveyor;

a coolant tank disposed directly beneath the first conveyor and the second conveyor and storing coolant that freezes the foods fallen from the second conveyor;

a third conveyor having at least one portion thereof submerged in the coolant in the coolant tank and conveying the foods fallen from the second conveyor while immersing them in the coolant in the coolant tank, the at least one portion including an end portion that is positioned beneath the second conveyor to receive the foods fallen from the second conveyor without the foods fallen from the second conveyor contacting a reversing plate;

a coolant spraying means disposed directly above the first conveyor and adapted for spraying the coolant toward the first conveyor; and wherein at least a portion of the coolant sprayed by the coolant spraying means passes through the holes of the mesh belt onto the foods on the second conveyor.

2. The continuous freezing apparatus according to claim 1, wherein a return portion of the second conveyor is located at a liquid level of the coolant in the coolant tank or below thereof.

3. The continuous freezing apparatus according to claim 1, comprising a cold air blowing means disposed between the coolant tank and the discharge portion and blowing cold air onto the foods taken out from the coolant in the coolant tank.

4. The continuous freezing apparatus according to claim 3, wherein the cold air blowing means is configured to be able to blow the cold air at temperatures from −35 to −45° C.

5. The continuous freezing apparatus according to claim 1, wherein the coolant spraying means uses the coolant in the coolant tank as a supply source.

6. The continuous freezing apparatus according to claim 1, wherein the third conveyor has at least one portion thereof located directly beneath the second conveyor.

7. The continuous freezing apparatus according to claim 1, wherein the mesh belt is made of metal or resin.

8. The continuous freezing apparatus according to claim 1, wherein the coolant spraying means comprises a plurality of showers disposed along an entire length of the first conveyor.

9. A continuous freezing method for freezing foods fed continuously from a feed portion while conveying them to a discharge portion, comprising the steps of:

conveying the foods fed from the feed portion in a first direction by a first conveyor having a mesh belt with holes;

conveying the foods fallen from the first conveyor in a second direction opposite to the first direction by a second conveyor extending directly beneath the first conveyor along the first conveyor;

conveying the foods fallen from the second conveyor directly into a coolant tank positioned underneath the first conveyor and the second conveyor and containing coolant without contacting a reversing plate;

conveying the foods fallen into the coolant tank with a third conveyor that includes a portion that is submerged within the coolant and extends directly beneath the second conveyor;

wherein during conveyance of the foods by the first and the second conveyors, coolant is sprayed on the foods on the first and the second conveyors by a coolant spraying means disposed directly above the first conveyor;

wherein at least a portion of the coolant sprayed by the coolant spraying means passes through the holes of the mesh belt onto the foods on the second conveyor; and wherein the foods fallen from the first conveyor are turned over by an arc-like reversing plate before they are conveyed in a second direction by the second conveyor.

10. The continuous freezing method according to claim 9, wherein, between the coolant tank and the discharge portion, cold air is blown onto the foods taken out from the coolant in the coolant tank.

11. The continuous freezing method according to claim 10, wherein, between the coolant tank and the discharge portion, cold air at temperatures from −35 to −45° C. is blown onto the foods taken out from the coolant in the coolant tank.

12. The continuous freezing method according to claim 9, wherein the mesh belt is made of metal or resin.

13. The continuous freezing method according to claim 9, wherein the coolant spraying means comprises a plurality of showers along an entire length of the first conveyor.

* * * * *